United States Patent Office 3,422,098
Patented Jan. 14, 1969

---

3,422,098
SULFANILAMIDO-PYRIMIDINES
Paul Schmidt, Therwil, Ernst Schweizer and Kurt Eichenberger, Basel, and Max Wilhelm, Allschwil, Switzerland, assignors to Ciba Corporation, New York, N.Y., a corporation of Delaware
No Drawing. Continuation-in-part of application Ser No. 328,052, Dec. 4, 1963. This application Mar. 10, 1964, Ser. No. 350,662
Claims priority, application Switzerland, Dec. 14, 1962, 14,734/62; Feb. 26, 1963, 2,447/63; Mar. 13, 1963, 3,183/63; Oct. 25, 1963, 13,134/63; Jan. 10, 1964, 252/64
U.S. Cl. 260—239.75
Int. Cl. A61k 25/00; C07d 51/44

14 Claims

ABSTRACT OF THE DISCLOSURE

The invention relates to 6-(para-aminobenzenesulfonamido)-pyrimidines of the formula

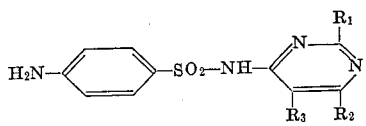

in which one of the radicals $R_1$ and $R_2$ represents a lower alkoxy-lower alkyl group and the other a hydrogen atom, a halogen atom, a lower alkyl group, a lower alkoxy group, a lower alkoxy-lower alkyl group or a lower alkoxy-lower alkoxy group and $R_3$ represents a lower alkyl radical, a lower alkoxy radical, a halogen atom or, preferably, a hydrogen atom, and their metal salts; also included are the $N_1$-acyl derivatives of these compounds. In addition, the invention includes intermediates for the 6-(para-aminobenzenesulfonamido)-pyrimidines, which latter compounds are useful as antibacterials.

---

This is a continuation-in-part of our copending application Ser. No. 328,052, filed Dec. 4, 1963, now abandoned.

The present invention relates to new sulfonamides. Especially it concerns 6-(para-aminobenzenesulfonamido)-pyrimidines of the formula

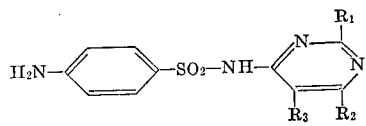

in which one of the radicals $R_1$ and $R_2$ represents a lower alkoxy-lower alkyl group and the other a hydrogen atom, a halogen atom, a lower alkyl group, a lower alkoxy group, a lower alkoxy-lower alkyl group or a lower alkoxy-lower alkoxy group and $R_3$ a lower alkyl radical, a lower alkoxy radical, a halogen atom or preferably a hydrogen atom, their salts and their $N_1$-acyl derivatives.

The lower alkyl groups in the new compounds are primarily those with 1 to 5 carbon atoms, such as methyl, ethyl, propyl or isopropyl groups, or straight or branched butyl or pentyl groups bound in any desired position. Lower alkoxy groups are, for example, those which contain the alkyl groups referred to above, more especially methoxy, ethoxy or propoxy groups.

The lower alkoxy groups present in the lower alkoxy-lower alkyl radicals are, for example, those mentioned above. The alkylene groups which link the oxygen atom with the pyrimidine nucleus are preferably alkylene groups with 1 to 5, advantageously 1 to 3, carbon atoms, such as methylene groups, or ethylene, propylene, butylene or pentylene groups bound in any desired position.

Lower alkoxy-lower alkyl groups are preferably those of the formula

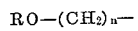

$$RO-(CH_2)_n-$$

in which R is an alkyl radical with 1 to 3 carbon atoms and $n=1$, 2 or 3.

The alkoxy groups present in the lower alkoxy-lower alkoxy groups are, for example, those referred to above. The alkylene group which links these alkoxy groups with the oxygen atom at the pyrimidine nucleus contains between the alkoxy group and the oxygen atom referred to at least two carbon atoms and contains preferably 2 to 5 carbon atoms, being primarily 1:2-ethylene, or 1:2-propylene, 2:3-propylene or 1:3-propylene, or butylene or pentylene which may be straight or branched and bound in any desired position, but which separates the vicinal oxygen atoms by at least two carbon atoms.

Suitable halogen atoms are more especially bromine, chlorine or fluorine atoms.

As $N_1$-acyl derivatives there may be especially mentioned those in which the acyl radical is a lower aliphatic, aromatic or araliphatic carboxylic acid radical, for example a carbalkoxy radical, for example the carbethoxy group, or preferably the radical of a fatty acid, for example of a lower fatty acid, e.g., of a lower alkanoic acid, such as a propionyl, butyryl, valeryl or caproyl group; or of a higher fatty acid, for example the lauroyl, palmityl or oleyl group; or of a phenyl-fatty acid, such as phenylacetic acid; or of a benzoic acid, such as benzoic acid. In the first place, however, the acyl group is the acetyl group.

The new compounds possess good antibacterial properties. For example, in animals, e.g., mice, experimentally infected, the compounds display a very good curative effect against gram-positive and gram-negative bacteria, such for example, as Streptococci, Staphylococci, Pneumococci and coli bacilli. They offer advantages over comparable known products. For example, according to experiments made, a substantially smaller amount of sulfonamide excreted in the urine is acetylated. They may, therefore, be used as chemotherapeutics, for example for the treatment of bacetrial infections, particularly of the urinary tract. Furthermore, they are suitable for use as additives to animal feedstuffs and may also be used as intermediates in the manufacture of other valuable chemotherapeutics.

Especially valuable are compounds of the formulae

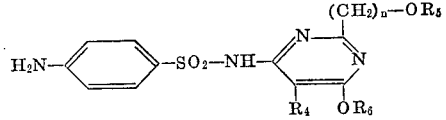

and

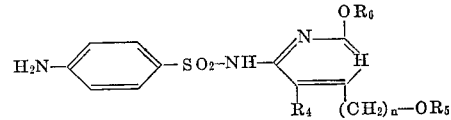

in which $R_5$ and $R_6$ each represents a lower alkyl group and $n=1$, 2 or 3 and $R_4$ has the meanings given for $R_3$ and stands especially for lower alkyl or lower alkoxy and more especially those compounds of the above formulae in which $R_4$ stands for a hydrogen atom and $R_5$, $R_6$ and $n$ have the meanings given, and salts and $N_1$-acyl derivatives of these compounds.

The most valuable compounds are the 6-(para-aminobenzenesulfonamido) - 2 - (methoxymethyl) - 4-methoxy-pyrimidine, its salts and $N_1$-acyl-derivatives, which form a special object of the invention.

The new compounds are prepared by as such known methods. Thus, for example, they are obtained, when a para-Z-benzene-sulfonyl halide, above all the chloride, is condensed with a compound of the formula

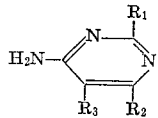

(in which $R_1$, $R_2$ and $R_3$ have the above meanings and Z represents the amino group or a nitro, azo or acrylamino group) or compounds of the formulae

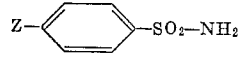

and

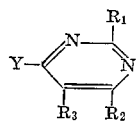

in which $R_1$, $R_2$, $R_3$ and Z have the above meanings and Y represents a halogen atom, such as chlorine, or a trialklammonium group, such as the trimethylammonium group are reacted together and in any desired order of succession in a resulting compound containing a nitro, azo or acylamino group, this group is converted into the amino group by reduction or hydrolysis and/or a resulting bis-para-Z-benzene-sulfonyl compound is split to yield a mono-para-Z-benezene-sulfonyl compound, and/or, if desired, a resulting compound is $N_1$-acylated.

The reaction of the para-Z-benzenesulfonyl halide with the aminopyrimidine may be carried out, e.g., with the use of a conventional condensing agent, for example an alkali metal carbonate, or above all a tertiary organic base, such as pyridine, picoline, lutidine, collidine, a lower trialkylamine such as trimethylamine or triethylamine, or an N:N'-tetraalkyldiaminoalkane such, for example, as N:N'-tetramethyl-ω:ω'-diaminohexane, or the aminopyrimidine itself, and if desired of a conventional diluent such as water, benzene, toluene, methylene chloride, chloroform, methylethyl ketone, acetone, dioxane, nitrobenzene or the like, or mixtures of these products. Depending on the reaction conditions (such as condensing agent, reaction temperature, diluent, or use of an excess of sulfonyl halide) the bis-para-Z-benzene-sulfonyl compounds are obtained as by-products or main products, which can be converted in known manner, if desired accompanied by conversion of Z into the amino group, into the mono-para-Z-benzenesulfonyl compounds. Thus, the bis-compounds are converted, for example by hydrolysis or aminolysis, if desired accompanied by possible hydrolysis of the radical $Z_1$, into the monocompounds.

The reaction of the para-Z-benzenesulfonamide with the 6-halogeno-pyrimidine or the 6-trialklammonium-pyrimidine salt, e.g., the chloride, is carried out in the conventional manner. It is of advantage to use the para-Z-benzenesulfonamide in the form of a metal salt, for example of an alkali metal or alkaline earth metal salt, or else the reactions are performed in the presence of a condensing agent that forms such a salt. When a 6-trialkylammonium-2-$R_1$-4-$R_2$-5-$R_3$-pyrimidine salt is used, it is of further special advantage to use an acid amide, such as a lower alkanoylamide, for example acetamide or dimethylformamide as diluent. The last-mentioned process, starting from a 6-halogen-pyrimidine or 6-trialklammoniumpyrimidine salt, has the advantage that it is very easy to perform with para-Z-benzenesulfonamides in which Z is the free amino group, whereas in the other process Z advantageously represents a nitro, azo or acylamino group.

The conversion of the nitro, azo or acylamino group into the amino group is performed in a known manner.

Nitro or azo groups or acylamino groups covertible by hydrogenolysis into the free amino group, such as carbobenzoxyamino groups, are converted into the free amino group in the usual manner by reduction or hydrogenolysis. Acylamino groups are converted into the free amino group in the usual manner by hydrolysis.

Acylamino groups are for example aliphatic acylamino groups, such as carbalkoxyamino groups, for example the carbethoxyamino group, or alkanoylamino groups such as the propionylamino, butyrylamino or caproylamino group, and above all the acetylamino group, or dihalogenophosphorylamino groups, for example the dichlorophosphorylamino group. The acyl radicals of the acylamino groups may also be acyl groups of dibasic acids. Thus it is possible to use alternatively starting materials of the formula

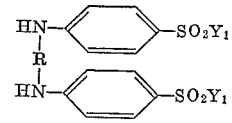

in which R represents the acyl radical of a dibasic acid, above all of carbonic acid, or for instance of an alkanedicarboxylic acid, and $Y_1$ represents halogen or the amino group.

An azo group is for example an arylazo or more especially the phenylazo group; in the latter case a preferred starting material is a compound of the formula

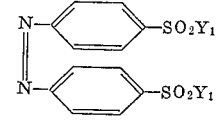

in which $Y_1$ represents a halogen atom or the amino group.

According to a particularly advantageous variant of the process para-acetylaminobenzenesulfonyl chloride is reacted with a 6-amino-2-$R_1$-4-$R_2$-5-$R_3$-pyrimidine and the condensation product is hydrolyzed.

The $N_1$-acylation is performed in the usual manner with the use of an $N_1$-acylating agent, above all an acid anhydride or halide, such as the acid chloride. The reaction is advantageously performed in the presence of a basic agent, such as an inorganic or organic base, for example an alkali metal carbonate or of a tertiary amine, such as pyridine, picoline, lutidine, collidine, trimethylamine, triethylamine, tributylamine or 1:6-bis-dimethyl-amino-hexane, and in the presence of inert diluent, more especially of an organic solvent, such as dioxane, benzene, toluene, a halogenated hydrocarbon, for example methylene chloride or chloroform, dimethylformamide, a lower aliphatic ketone, such as acetone or methylethyl ketone, or if desired of the basic agent itself, such, for example, as pyridine, or of a mixture thereof, more especially pyridine+acetone. It is of advantage to use a medium that is as free from water as possible. When an acid halide is used, it is possible to use a metal salt of the sulfonamide, for example an alkali metal salt or better the silver salt thereof, and in such a case the addition of a basic agent as recommended above is not necessary, though there is no reason why such an agent should not be additionally used, for example as diluent.

In $N_1$-acylating a compound in which Z stands for the amino group the reaction must be performed under mild conditions and with the use of approximately equimolecular proportions of the reactants to prevent the formation of $N_1$, $N_4$-bis-acyl compounds or, by acyl migration, $N_4$-acyl compounds. It is thus of advantage to use a lower temperature, for example below 40° C., such as a temperature ranging from 10 to 30° C., and an anhydrous medium. When an acid halide is used it is of advantage to start from a metal salt of the sulfonamide, such as its silver salt.

When the acyl group is introduced into the $N_1$-nitrogen atom of a compound in which Z does not stand for the amino group, a preferred starting material is a compound in which Z stands for a nitro or azo group, which is then reduced in a known manner, advantageously while preventing hydrolysing conditions and a high temperature to obviate the splitting off or migration of the $N_1$-acyl group to the $N_4$-nitrogen atom. It is of special advantage to perform the reduction with hydrogen in the presence of a catalyst, for example a noble metal catalyst, such as palladium on carbon.

Depending on the reaction conditions and on the starting materials, the end products are obtained in the free form or in the form of their salts which are also included within the scope of the invention. As salts there may be mentioned more especially metal salts, particularly those with an alkali metal, alkaline earth metal or earth metal, such as sodium, potassium, calcium, magnesium or aluminum. The salts of the new compounds may also be converted into the free compounds by methods known per se, for example by reaction with an acidic agent, such as an acid. On the other hand, a resulting free sulfonamide containing a hydrogen atom at the $N_1$-nitrogen atom may be converted into a salt by reaction with a base, particularly a therapeutically useful base, such as a hydroxide of an alkali, alkaline earth or earth metal, for example sodium, potassium or calcium hydroxide.

The above or other salts of the new compounds may also serve for the purification of the resulting sulfonamide compounds by converting the free sulfonamides into the salts, separating the latter and liberating the free sulfonamides from the salts. In view of the close relationship between the new compounds in the free form and in the form of their salts, what has been said above and hereinafter with reference to the free compounds refers similarly also to the corresponding salts whenever this applies.

The invention includes also any modification of the process in which an intermediate obtainable at any stage of the process is used as starting material and any remaining steps are carried out or the process is discontinued at any stage thereof, or in which a starting material is formed under the reaction conditions or is used in the form of a salt thereof.

For the reactions of the present invention such starting materials are preferably used as yield the abovementioned preferred compounds.

Some of the starting material are known; those which are new can be prepared by known methods.

The 2-$R_1$-4-$R_2$-5-$R_3$-6-$R_7$-pyrimidines used as starting materials, in which $R_1$, $R_2$ and $R_3$ have the meanings given above and $R_7$ represents a free hydroxyl, mercapto or amino group or a substituted mercapto group, such as an alkylmercapto or benzylmercapto group, an ammonium group such as a lower trialkylammonium group or a halogen atom, such as chlorine or bromine, are new and also included within the scope of the invention. They are obtained in a manner known per se by reacting an amidine of the formula

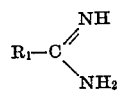

in which $R_1$ has the meaning given above, or a salt thereof with a compound of the formula

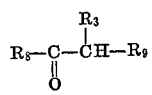

in which $R^3$ has the meaning given above, $R_8$ represents a lower alkoxy lower alkyl group, or, if $R_1$ stands for a lower alkoxy lower alkyl group, $R_8$ may also represent a hydrogen atom, a lower alkyl group or an etherified hydroxyl group and $R_9$ stands for an esterified carboxyl group or a thioamide or nitrile group, or an oxo derivative thereof, such as an enol ether or imine, and, if desired, in a resulting compound the hydroxy group in the 4- and/or 6-position is converted into a halogen atom, and/or a hydroxyl group in the 6-position is converted into a mercapto group, and/or a halogen atom in the 6-position is converted into a free or substituted mercapto group or a free amino group, and any free mercapto group in the 6-position is converted into a substituted mercapto group, and/or a free or substituted mercapto group into a free amino group, and/or a halogen atom in the 4-position is converted into a lower alkoxy group or a lower alkoxy-lower alkoxy group or replaced by hydrogen, and/or a halogen atom in 6-position is converted into an ammonium group.

The above reactions are carried out in the conventional manner, the conversion of the hydroxyl groups into halogen atoms, for example, by treatment with a halide of an acid of sulfur or phophorus, for example phosphorus oxychloride. The conversion of a halogen atom or of a free or substituted mercapto group into a free amino group is performed, for example, by reaction with ammonia. The conversion of a hydroxyl group into a mercapto group is performed, for example, by treatment with a sulfurizing agent, such as phosphorus pentasulfide. The conversion of a halogen atom into a free or substituted mercapto group is carried out, for example, by reaction with thiourea or with hydrogen sulfide or a mercaptan or, more especially, a metal salt thereof, such as an alkali metal salt. The conversion of a free mercapto group into a substituted mercapto group is carried out, for example, by reaction with a reactive ester of an appropriate alcohol, for example with an ester of hydrohalic acid or of an arylsulfonic acid. The conversion into a lower alkoxy group or a lower alkoxy-lower alkoxy group is carried out by reaction with a lower alkanolate or a lower alkoxy-lower alkanolate. The replacement of a halogen atom by hydrogen is performed, for example, by hydrogenation in the presence of a catalyst, such as a nickel catalyst. A halogen atom can be converted into an ammonium group by reaction with a tertiary amine.

The aforementioned amidines are obtained, for example, by converting a nitrile of the formula $R_1C \equiv N$ into an imido ether thereof and reacting the latter with ammonia.

The above reactions are carried out in a manner known per se (preferably in the presence of a diluent and, if desired or required, at an elevated temperature and/or in the presence of a condensing agent.

The new compounds may be used for example in the form of pharmaceutical preparations containing the active material in admixture or conjunction with an organic or inorganic, solid or liquid pharmaceutical excipient suitable for enteral, parenteral or topical administration. Suitable excipients are substances that do not react with the new compounds, for example water, gelatine, lactose, starches, colloidal silicic acid, magnesium stearate, talcum, vegetable oils, benzyl alcohols, gums, polyalkylene glycols, white petroleum jelly, cholesterol or other known medicinal excipients. The pharmaceutical preparations may be, for example, tablets, dragees, salves or creams, or in liquid form solutions, suspensions or emulsions. They may be sterilized and/or may contain assistants such as preserving, stabilizing, wetting or emulsifying agents, salts for regulating the osmotic pressure or buffers. They may also contain other therapeutically valuable substances. The preparations are formulated by known methods.

The new active principles may also be used as additives to animal feedstuffs. Accordingly, the invention also includes these animal feedstuffs or additives to animal feedstuffs, containing the new sulfonamides of the kind defined above in admixture with the conventional vehicles.

The following examples illustrate the invention.

Example 1

A solution of 10 g. of 2-(methoxymethyl)-4-methoxy-5-methyl-6-aminopyrimidine in 135 cc. of absolute pyridine is mixed portionwise with 15.8 g. of para-carbethoxyaminobenzenesulfonylchloride, and the mixture is stirred for 48 hours at room temperature and then vigorously stirred into a mixture of 2 N-hydrochloric acid and ice at a rate such that the pH-value remains constant at 1 to 2 and the temperature does not rise above 5° C. The precipitate is suctioned off, boiled for 2 hours with 200 cc. of N-sodium hydroxide solution, and the solution is treated with active carbon, filtered and while being cooled with ice adjusted with acetic acid of 50% strength to pH=5.5 to 6. 6-(para-aminobenzenesulfonamido)-2-(methoxymethyl)-4-methoxy-5-methyl-pyrimidine of the formula

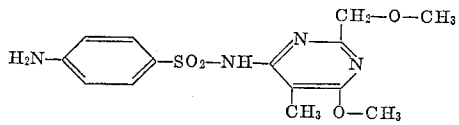

is obtained in the form of crystals melting at 206–207° C.

The 2 - (methoxymethyl)-4-methoxy-5-methyl-6-aminopyrimidine used as starting material is prepared as follows:

Hydrochloric acid dried over concenrated sulphuric acid is introduced at 0° C. into a mixture of 335 g. of methoxyacetonitrile and 300 cc. of ethanol until saturation has been achieved. The reaction mixture is kept overnight in a refrigerator at +5° C., then rapidly suction-filtered and the methoxy-acetimino-ethyl ether hydrochloride, while still moist with ether, is introduced with cooling into 500 cc. of amoniacal ethanol solution of 12% strength. The whole is shaken for 12 hours and the precipitated ammonium chloride is filtered off, and the filtrate is evaporated under vacuum at 50° C. Methoxy-acetamidine hydrochloride crystallises out and melts at 70° C. after having been recrystallised from ethanol + ether.

A solution of 62 g. of methoxyacetamidine hydrochloride in 200 cc. of methanol is mixed with 87 g. of methylmalonic acid diethyl ester. In the course of 2 hours a sodium methylate solution prepared from 34.5 g. of sodium and 800 cc. of methanol is dropped in and the batch is stirred for 24 hours at 60° C., then evaporated to dryness under vacuum, the residue is dissolved in 250 cc. of water and the solution is adjusted to pH=6. On cooling, crystalline 2 - (methoxymethyl)-4,6-dihydroxy-5-methylpyrimidine settles out. After having been recrystallised from glacial acetic acid it melts at 290° C. with decomposition.

17 g. of the above compound are stirred at 140° C. in 80 cc. of phosphorus oxychloride and 20.2 g. of triethylamine. Fractionation after having distilled off the phosphorus oxychloride furnishes 2-(methoxymethyl)-4,6-dichloro-5-methylpyrimidine which melts at 31° C. and boils at 77° C. under a pressure of 0.06 mm. Hg.

A mixture of 10.3 g. of 2 - (methoxymethyl)-4,6-dichloro-5-methylpyrimidine and 100 cc. of ammonia is heated in an autoclave for 10 hours at 70° C. The ammonia is then blown off and the residue digested with water. 2 - (methoxymethyl)-4-chloro-5-methyl-6-aminopyrimidine melts at 150–151° C.

A solution of 9.4 g. of the above product in 100 cc. of absolute methanol is mixed with 5.4 g. of sodium methylate, and the reaction mixture is stirred and heated for 20 hours at 60° C. Carbon dioxide is then introduced for neutralisation, and to precipitate the salts 100 cc. of ether are added; the batch is filtered and the filtrate is evaporated to dryness. The 2-(methoxymethyl)-4-methoxy-5-methyl-6-aminopyrimidine obtained in this manner is transformed into the sulphonamide without first having been purified.

Example 2

29 g. of para-carbethoxyaminobenzenesulfonylchloride are added in portions to a solution of 19.7 g. of 2-(methoxymethyl)-4-methoxy - 5 - ethyl-6-aminopyrimidine in 100 cc. of absolute pyridine and the mixture stirred at 40° C. for 12 hours, then poured onto a mixture of 2 N-hydrochloric acid and ice in such manner that the pH value constantly remains at 1–2 and the temperature does not rise above 5° C. The precipitate that forms is filtered off. 23 g. of the resulting 6-(para-carbethoxyaminobenzenesulfonamido) - 2 - (methoxymethyl)-4-methoxy-5-ethylpyrimidine are dissolved in 500 cc. of ethanol, treated with 250 cc. of 2.5 N-sodium hydroxide solution and refluxed for 2 hours. The ethanol is distilled off and the residue dissolved in water. On neutralization with 50% acetic acid the 6-(para-amino-benzenesulfonamido)-2-(methoxymethyl) - 4 - methoxy-5-ethyl-pyrimidine of the formula

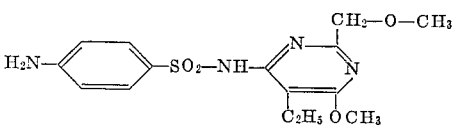

precipitates in crystalline form. After two recrystallizations from ethanol+water, the melting point is at 180–181° C.

The 2-(methoxymethyl)-4-methoxy - 5 - ethyl-6-aminopyrimidine used as starting material can be prepared as follows:

62 g. of methoxyacetamidine hydrochloride are condensed with 94 g. of ethylmalonic acid diethyl ester in a methylate solution obtained from 34.5 g. of sodium and 1 litre of absolute methanol. The mixture is stirred at 60° C. for 24 hours, the methanol removed, the residue treated with 400 cc. of water, and the hot solution neutralized, whereupon the 2-(methoxymethyl) - 4,6 - dihydroxy-5-ethylpyrimidine separates. Melting point after recrystallization from glacial acetic acid, 281–282° C.

46 g. of this compound are treated with 250 cc. of phosphorus oxychloride and 50.5 g. of triethylamine, and the mixture stirred at 120° C. for 2 hours. The phosphorus oxychloride is distilled off, and 2-(methoxymethyl)-4,6-dichloro-5-ethyl-pyrimidine obtained by fractional distillation. Boiling point, 69° C. under a pressure of 0.07 mm. Hg.

30 g. of this compound were heated in an autoclave at 70° C. for 10 hours together with 250 cc. of liquid ammonia. The ammonia is expelled and the residue slurried with 50 cc. of water, filtered with suction, and recrystallized from ethyl acetate. The 2-(methoxymethyl)-4-chloro-5-ethyl-6-aminopyrimidine melts at 168–169° C.

25 g. of this pyrimidine are entered into a methylate solution prepared from 5.75 g. of sodium and 300 cc. of methanol, and the mixture refluxed for 24 hours. The methanol is then removed, the residue treated with water, and neutralized, the 2 - (methoxymethyl)-4-methoxy-5-ethyl-6-aminopyrimidine separating; melting point after recrystallization from carbon tetrachloride, 83–84° C.

Example 3

5.4 g. of 2,4-di-(methoxymethyl)-5-methyl-6-chloropyrimidine are added dropwise at 140° C. to a melt consisting of 8.6 g. of sulfanilamide, 7 g. of anhydrous potassium carbonate, and 4 g. of acetamide, and the mixture stirred on for 2 hours at that temperature. After cooling, the melt is dissolved in 30 cc. of water, treated with active carbon, and the filtrate rendered alkaline with sodium carbonate. The precipitated sulfanilamide is filtered off from the filtrate the 6 - (para-aminobenzenesulfonamido) - 2,4 - di - (methoxymethyl)-5-methylpyrimidine of the formula

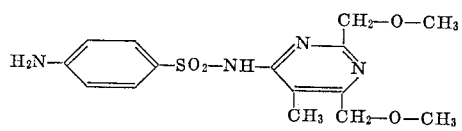

melting at 95–97° C. precipitated by neutralization with 50% acetic acid.

The 2,4-di-(methoxymethyl)-5-methyl-6-chloropyrimidine used as starting material can be prepared as follows:

271.5 g. of α-bromopropionic acid ethyl ester and 71 g. of methoxyacetonitrile are subjected to the Blaise reaction with 97 g. of zinc to form α-methyl-β-keto-γ-methoxy-butyric acid ethyl ester (boiling at 103–105° C. under a pressure of 14 mm. Hg).

123 g. of this ester are condensed with 95 g. of methoxyacetamidine hydrochloride by means of a methylate solution obtained from 35 g. of sodium and 750 cc. of absolute methanol. The mixture is refluxed for 16 hours, the methanol then distilled off, the residue taken up in water, neutralized, extracted with methylene chloride, the dried solution is evaporated, and the residue recrystallized from ethyl acetate. The 2,4-di-(methoxymethyl)-5-methyl-6-hydroxypyrimidine melts at 105–106° C.

59.4 g. of this compound are chlorinated with 300 cc. of phosphorus oxychloride and 42 cc. of triethylamine by stirring the mixture at 120° C. for 2 hours. The phosphorus oxychloride is distilled off and the residue subjected to fractional distillation. The 2,4-di-(methoxymethyl)-5-methyl-6-chloropyrimidine boils at 83° C. under a pressure of 0.025 mm. of Hg.

Example 4

21.3 g. of 2,4-di-(methoxymethyl)-5-methoxy-6-aminopyrimidine are dissolved in 100 cc. of absolute pyridine and stirred into 29 g. of para-carbethoxyaminobenzenesulfonylchloride portionwise. The reaction mixture is stirred for 12 hours and then introduced into a mixture of hydrochloric acid and ice in such manner that the pH value constantly remains at 1–2 and the temperature does not exceed 5° C. The precipitate is filtered off and, while still moist, hydrolyzed with 250 cc. of N-sodium hydroxide solution. The ice-cold solution is neutralized with 50% acetic acid. The 6-(para-aminobenzenesulfonamido)-2,4-di-(methoxymethyl)-5-methoxy-pyrimidine of the formula

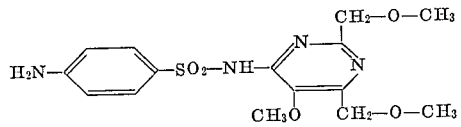

is isolated and recrystallized from ethanol. Melting point, 120–121° C.

The 2,4-di-(methoxymethyl)-5-methoxy-6-aminopyrimidine used as starting material can be obtained as follows:

21.3 g. of methoxyacetonitrile are trimerized in liquid ammonia with sodamide from 2.3 g. of sodium, the ammonia evaporated after the addition of 60 cc. of butyl ether. By refluxing for 3 hours, the trimeric product is cyclized. After cooling, the butyl ether is decanted, the residue dissolved in water, extracted with methylene chloride, the solution dried, filtered and evaporated. The 2,4-di-(methoxymethyl)-5-methoxy-6-aminopyrimidine is then distilled under a high vacuum. Boiling point, 128–130° C. under a pressure of 0.01 mm. of Hg. Melting point, 80–81° C. after recrystallization from ether+petroleum ether.

Example 5

19.5 g. of 2,5-dimethyl-4-(methoxymethyl)-6-chloropyrimidine are dissolved in 160 cc. of a solution of trimethylamine in benzene of 8.5% strength and the solution allowed to stand at room temperature for 5 days. The benzene is distilled off in vacuo, and the residue taken up in 100 cc. of absolute ether, the yellow impurity passing into solution. The reaction mass is suction filtered and the residue added rapidly at 120° C. to a melt of 26 g. of sulfanilamide, 20 g. of anhydrous potash and 45 g. of acetamide, and the whole stirred at 120° C. for a further 2 hours. The melt is allowed to cool and then dissolved in 150 cc. of water, the solution treated with active carbon and filtered, then rendered alkaline with sodium carbonate. The sulfanilamide is filtered off and the 6-(para-aminobenzenesulfonamido)-2,5-dimethyl-4-(methoxymethyl)-pyrimidine of the formula

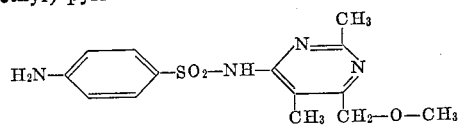

precipitated from the filtrate by neutralization with acetic acid of 50% strength. After recrystallization from methanol the melting point is at 214–215° C.

The 2,5-dimethyl-4-(methoxymethyl)-6-chloropyrimidine used as starting material can be prepared as follows:

87 g. of α-methyl-β-keto-γ-methoxybutyric acid ethyl ester and 52 g. of acetamidine hydrochloride are dissolved in 150 cc. of absolute methanol and the solution treated with a methylate solution prepared from 25 g. of sodium and 300 cc. of methanol. The mixture is refluxed for 12 hours and the methanol then distilled off, the residue taken up in water, extracted with methylene chloride, the solution dried over "Sikkon" (registered trademark), filtered and evaporated. The ersidual 2,5-dimethyl-4-(methoxymethyl)-6-hydroxypyrimidine is recrystallized from carbon tetrachloride+petroleum ether. Melting point, 158° C.

33.6 g. of this compound are stirred at room temperature overnight with 200 cc. of phosphorus oxychloride. 10 g. of triethylamine are then added and the mixture stirred for another hour at 120° C. The phosphorus oxychloride is distilled off, the residue taken up in methylene chloride, and the solution stirred into ammoniacal ice water. The reaction mass is extracted once more with methylene chloride, the combined organic phases dried over "Sikkon" (registered trademark), filtered and, after the solvent has been distilled off, subjected to fractional distillation. The 2,5-dimethyl-4-(methoxymethyl)-6-chloropyrimidine boils at 56–57° C. under a pressure of 0.2 mm. Hg.

Example 6

At 145° C., 14 g. of 4-(methoxymethyl)-5-methyl-6-chloropyrimidine are added dropwise to a melt obtained from 28 g. of sulfanilamide, 22.5 g. of anhydrous potash and 12 g. of acetamide. The mixture is maintained at the indicated temperature for 2 hours. After cooling, the melt is dissolved in 80 cc. of water, the solution treated with active carbon and rendered alkaline with sodium carbonate and the precipitated sulfanilamide filtered off. On neutralization of the filtrate with 50% acetic acid the 6-(para-aminobenzenesulfonamido)-4-(methoxymethyl)-5-methylpyrimidine of the formula

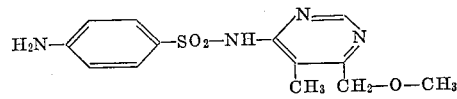

precipitates and is recrystallized from methanol or water, Melting point, 196° C.

The 4-(methoxymethyl)-5-methyl-6-chloropyrimidine used as starting material can be obtained as follows:

40 g. of α-methyl-β-keto-γ-methoxybutyric acid ethyl ester and 26 g. of formamidine acetate are dissolved in 100 cc. of absolute methanol and treated with a methylate solution prepared from 11.5 g. of sodium and 150 cc. of absolute methanol, and the whole is stirred at 50° C. for 12 hours. The methanol is distilled off, the residue taken up in water, neutralized, and extracted with methylene chloride, the solution is dried over "Sikkon" (registered trademark), filtered, and evaporated. The residual 4-methoxymethyl)-5-methyl-6-hydroxy-pyrimidine is recrystallized from ethanol and then melts at 140–141° C.

46.2 g. of this compound are stirred overnight with 300 cc. of phosphorus oxychloride, treated with 15 g. of triethylamine, and stirred on for 1 hour at 120° C. The phosphorus oxychloride is distilled off and the residue introduced into ammoniacal ice-water and extracted with benzene. The solution is dried over "Sikkon" (registered trademark), and then fractionated. The 4-(methoxymethyl)-5-methyl-6-chloropyrimidine of the formula

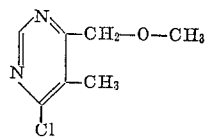

boils at 60° C. under a pressure of 0.02 mm. of Hg. Melting point, 36–47° C.

Example 7

At 100° C., 12.6 g. of 2,4-di-(methoxymethyl)-5-ethyl-6-chloropyrimidine are added dropwise to a melt of 19.2 g. of sulfanilamide, 15 g. of anhydrous potash and 8 g. of acetamide, and the whole stirred on for 2 hours at 140° C. The ice-cold melt is dissolved in 60 cc. of water, the solution treated with active carbon and rendered alkaline with sodium carbonate. The sulfanilamide is filtered off and the filtrate neutralized with 50% acetic acid. The precipitated 6 - (para - aminobenzenesulfonamido)-2,4-di-(methoxymethyl)-5-ethylpyrimidine of the formula

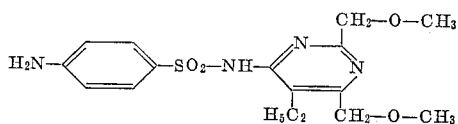

is recrystallized three times. Melting point, 112–113° C.

The 2,4 - di - (methoxymethyl) - 5 - ethyl - 6 - chloro-pyrimidine used as starting material can be obtained as follows:

295 g. of α-bromobutyric acid ethyl ester and 71 g. of methoxyacetonitrile are subjected to the Blaise reaction with 97 g. of zinc to form α-ethyl-β-keto-γ-methoxybutyric acid ethyl ester. Boiling point, 107–108° C. under a pressure of 12 mm. of Hg.

140 g. of this compound and 100 g. of methoxyacetamidine hydrochloride are dissolved together in 250 cc. of absolute methanol, and in the course of 2 hours a methylate solution from 38 g. of sodium and 500 cc. of absolute methanol added dropwise. The batch is stirred for 16 hours at 50° C., and the methanol then distilled off, the residue taken up in water, the solution neutralized and extracted with methylene chloride. Drying over "Sikkon" (registered trademark) is followed by evaporation. The resulting 2,4 - di - (methoxymethyl) - 5 - ethyl - 6 - hydroxypyrimidine is recrystallized from ether. Melting point 81–82° C.

42.4 g. of this compound are stirred overnight with 200 cc. of phosphorus oxychloride, after which 10 g. of triethylamine are added and the batch stirred on for 2 hours at 120° C. The phosphorus oxychloride is distilled off, the residue introduced into ammoniacal ice-water, and extracted with benzene. The benzene solution is dried over "Sikkon" (registered trademark), the benzene distilled off, and the residue subjected to fractional distillation under a high vacuum. The 2,4-di-(methoxymethyl)-5-ethyl-6-chloro-pyrimidine boils at 87° C. under a pressure of 0.04 mm. Hg.

Example 8

At 120° C., 11.5 g. of 2-(methoxymethyl)-5-methyl-6-chloro-pyrimidine are added dropwise to a melt of 23 g. of sulfanilamide, 18 g. of anhydrous potassium carbonate, and 10 g. of acetamide, and the batch stirred on for 1 hour at 140° C. The cooled melt is dissolved in water and the solution purified with active carbon and rendered alkaline with sodium carbonate, the precipitate is filtered off and neutralized with 50% acetic acid. The 6-(para-aminobenzenesulfonamido) - 2-(methoxymethyl)-5-methylpyrimidine of the formula

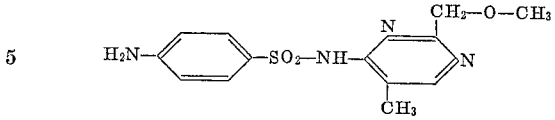

precipitates. Its melting point is at 237–238° C. after recrystallization from water.

The 2 - (methoxymethyl)-5-methyl-6-chloropyrimidine used as starting material can be prepared as follows:

65 g. of α-formylpropionic acid ethyl ester and 62 g. of methoxyacetamidine hydrochloride are dissolved in 200 cc. of absolute methanol and to the solution is added at room temperature in the course of 2 hours a methylate solution prepared from 345 g. of sodium and 500 cc. of absolute methanol. The batch is then stirred at 50° C. for 12 hours. The methanol is distilled off, the residue taken up in water and neutralized. On cooling, the 2 - (methoxymethyl)-5-methyl-6-hydroxypyrimidine crystallizes. Melting point, 114–115° C.

30.8 g. of this compound are stirred for several hours with 200 cc. of phosphorus oxychloride. 10 g. of triethylamine are then added and the whole stirred for another 2 hours at 120° C. The phosphorus oxychloride is distilled off, the residue introduced into ammoniacal ice-water. The batch is extracted with benzene, and the solution dried and fractionated. The 2-(methoxymethyl)-5-methyl-6-chloropyrimidine boils at 58–59° C. under a pressure of 0.025 mm. Hg.

Example 9

34.4 g. of sulfanilamide, 28 g. of anhydrous potassium carbonate and 15 g. of acetamide are melted, and 18.5 g. of 2-(methoxymethyl)-5-methoxy-6-chloropyrimidine added portionwise at 130° C. After completion of the reaction, the batch is stirred at 140° C. for another hour. The cooled melt is dissolved in 100 cc. of water, the solution rendered alkaline with sodium carbonate, and, after a few hours, the precipitate filtered off with suction, and the filtrate neutralized with 50% acetic acid. Crystals of 6-(para-aminobenzene-sulfonamido)-2-(methoxymethyl)-5-methoxypyrimidine of the formula

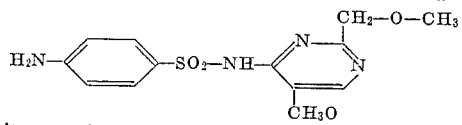

precipitate and are recrystallized from water when they melt at 229–231° C.

The 2-(methoxymethyl)-5-methoxy-6-chloropyrimidine used as starting material can be obtained as follows:

65 g. of α-formyl-methoxyacetic acid ethyl ester and 56 g. of methoxy-acetamidine hydrochloride are dissolved in 150 cc. of absolute methanol. The batch is stirred while, in the course of 2 hours a methylate solution obtained from 21 g. of sodium and 300 cc. of absolute methanol is added dropwise, and then stirred at 50° C. for another 12 hours. The methanol is distilled off, the residue taken up in water and neutralized. The aqueous solution is extracted with methylene chloride. The methylene chloride solution is dried, the methylene chloride evaporated, and the resulting 2 - (methoxymethyl)-5-methoxy-6-hydroxypyrimidine recrystallized from ethyl acetate. Melting point 112–113° C.

42 g. of this compound are stirred for several hours at room temperature with 250 cc. of phosphorus oxychloride, then 12.5 g. of triethylamine added, and stirring continued at 120° C. for 2 hours. The phosphorus oxychloride is distilled off, the residue introduced into ammoniacal ice-water, the resulting precipitate taken up in methylene chloride, the solution dried over "Sikkon" (registered trademark), filtered and evaporated. For purification, the 2 - (methoxymethyl)-5-methoxy-6-chloropyrimidine may be distilled. Boiling point, 118° C. under a pressure of 0.4 mm. Hg. Melting point, 73–74° C.

Example 10

At 120° C., 19.3 g. of 2-(methoxymethyl)-4,5-dichloropyrimidine are added portionwise to a melt of 34.4 g. of sulfanilamide, 28 g. of anhydrous potassium carbonate and 15 g. of acetamide, and stirring continued for 2 hours at 140° C. The cooled melt is dissolved in water, the solution purified with active carbon, filtered and rendered alkaline with sodium carbonate. A few hours later, the precipitate is filtered off with suction, and the 6-(para-aminobenzene - sulfonamido) - 2 - (methoxymethyl) - 5-chloropyrimidine of the formula

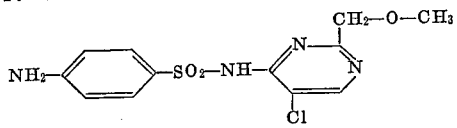

precipitated from the filtrate by neutralization with 50% acetic acid. Melting point, 218–219° C. after recrystallization from methanol.

The 2-(methoxymethyl)-4,5-dichloropyrimidine used as starting material can be obtained as follows:

60 g. of formylchloroacetic acid ethyl ester and 50 g. of methoxyacetamidine hydrochloride are dissolved in 200 cc. of absolute methanol. At room temperature, a methylate solution obtained from 18.2 g. of sodium in 300 cc. of absolute methanol is added dropwise in the course of 2 hours and the batch stirred for another 12 hours at 50° C. The methanol is distilled off, the residue taken up in hot water, and the solution neutralized and concentrated. On cooling, the 2-(methoxymethyl)-5-chloro - 6 - hydroxypyrimidine crystallizes. Melting point, 153° C.

61 g. of this compound are chlorinated at 120° C. for 2 hours with 350 cc. phosphorus oxychloride, 17.5 g. of triethylamine being added. The phosphorus oxychloride is distilled off and the residue introduced into ammoniacal ice-water. The precipitate is taken up in benzene, the benzene solution dried over "Sikkon" (registered trademark), and the solvent distilled off. The 2-(methoxymethyl)-4,5-dichloropyrimidine which remains behind can be distilled for further purification. Boiling point, 68–69° C. under a pressure of 0.4 mm. Hg. Melting point after recrystallization from aqueous ethanol, 40° C.

Example 11

At 120° C., 11.3 g. of 2-(methoxymethyl)-4,5,6-trichloropyrimidine are added in portions to a melt of 17.2 g. of sulfanilamide, 14 g. of anhydrous potassium carbonate and 7.5 g. of acetamide, stirring is continued for 1 hour, 100 cc. of water added, and the batch boiled for a short while with active carbon. The cooled solution is treated with 2–3 cc. of glacial acetic acid and then with an excess of sodium carbonate, and allowed to stand for several hours. The excess sulfanilamide is filtered off and the filtrate neutralized with 50% acetic acid to precipitate the 6-(para-aminobenzenesulfonamide)-2-(methoxymethyl)-4,5-dichloropyrimidine of the formula

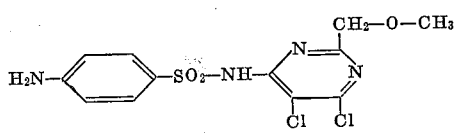

which, after being recrystallized from aqueous ethanol melts at 169–171° C.

The 2-(methoxymethyl)-4,5,6-trichloropyrimidine used as starting material can be prepared as follows:

62 g. of methoxyactamidine hydrochloride and 97 g. of chloromalonic acid diethyl ester are dissolved in 200 cc. of absolute methanol. A methylate solution obtained from 46 g. of sodium and 700 cc. of methanol is then added dropwise and the batch stirred for 24 hours at 30° C. The methanol is distilled off and the residue dissolved in 500 cc. of hot water, and the solution neutralized with glacial acetic acid. On cooling, the 2-(methoxymethyl)-4,6-dihydroxy-5-chloropyrimidine separates. Melting point, >300° C.

47.5 g. of this compound are slurried in 100 cc. of absolute toluene and stirred with 250 cc. of phosphorus oxychloride and 70 cc. of triethylamine at 120° C. for 2 hours. The phosphorus oxychloride is distilled off, the residue taken up in toluene, and the solution stirred into ammoniacal ice-water. The organic phase is dried over "Sikkon" (registered trademark), filtered, and the filtrate fractionated. The 2-(methoxymethyl)-4,5,6-trichloropyrimidine boils at 69° C. under a pressure of 0.02 mm. Hg. Melting point, 41–42° C.

Example 12

23.9 g. of para-nitrobenzenesulfonylchloride are added in portions to a solution of 18.3 g. of 2-(methoxymethyl)-4-methoxy-5-methylpyrimidine in 150 cc. of absolute pyridine and the mixture stirred at room temperature for 48 hours, then added to a mixture of hydrochloric acid and ice-water in such manner that the pH value constantly remains at 1–2 and the temperature does not rise above 5° C. The precipitate is filtered off with suction, dissolved in 300 cc. of 70% ethanol with the addition of sodium hydroxide solution, and hydrogenated with the use of Raney nickel as a catalyst. The catalyst is removed by filtration and the solution evaporated to dryness. The residue is taken up in dilute sodium hydroxide solution, and the solution neutralized with 50% acetic acid. The resulting precipitate is 6-(para-aminobenzene sulfonamide)-2-(methoxymethyl)-4-methoxy-5-methylpyrimidine, identical with the product described in Example 1. Melting point, 206–207° C.

Example 13

While stirring a mixture of 6 g. of sulfanilamide, 7 g. of acetamide and 5 g. of finely ground potassium carbonate, 7 g. of 2-methyl-4-(methoxymethyl)-5-methoxy-6-chloropyrimidine are added dropwise at 140° C. The batch is heated at 140° C. for 2 hours and 12 cc. of water then added. A pH value of 8 is established by the addition of 2 N-hydrochloric acid. Active carbon is added, the solution filtered, and the filtrate given a pH of 4–5 by adding 2 N-hydrochloric acid. The resulting precipitate is recrystallized several times from ethanol to obtain 6-(para-aminobenzenesulfonamido) - 2-methyl-4-(methoxymethyl)-5-methoxy-pyrimidine of the formula

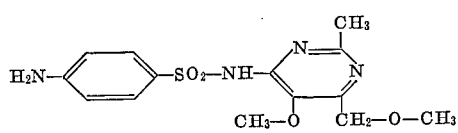

in the form of crystals melting at 218–220° C.

The 2-methyl-4-(methoxymethyl)-5-methoxy-6-chloropyrimidine used as starting material can be obtained as follows:

10 g. of acetamidine hydrochloride and 19 g. of α,γ-dimethoxy-β-oxo-butyric acid ethyl ester are added to a solution of 4.6 g. of sodium in 200 cc. of alcohol and the mixture refluxed for 2 hours, then evaporated to dryness. The residue is dissolved in water and the solution neutralized by the addition of 2 N-hydrochloric acid. The neutral solution is evaporated to dryness under reduced pressure. The residue is boiled with methylene chloride, the solution filtered and the filtrate concentrated by evaporation. Recrystallization of the residue yields the 2-methyl-4 - (methoxymethyl)-5-methoxy-6-hydroxy-pyrimidine in the form of crystals which melt at 165–167° C.

9 g. of this hydroxy-pyrimidine are dissolved in 12 g. of dimethylaniline and the solution carefully treated with phosphorus oxychloride. The mixture is boiled for 4 hours,, then evaporated to dryness in vacuo. The residue is dissolved in methylene chloride and extracted twice with water. After drying and evaporation of the organic layer there remains an oil which distills at 70–72° C.

under a pressure of 0.1 mm. Hg. The 2-methyl-4-methoxy-6-chloro-pyrimidine is so obtained.

Example 14

While stirring a mixture of 30 g. of N₄-acetylsulfanilamide, 30 g. of acetamide and 20 g. of potassium carbonate, there are added dropwise at 110° C. 10 g. of 4-(methoxymethyl)-5-methoxy-6-chloropyrimidine, and stirring continued for 3 hours at 130° C. When the melt has cooled, 75 cc. of water are added and the solution neutralized by the addition of 2 N-hydrochloric acid. The resulting precipitate is filtered off, the filtrate evaporated to dryness in vacuo, and 150 cc. of 2 N-sodium hydroxide solution added to the residue, and the whole refluxed for 2 hours. 150 cc. of 2 N-hydrochloric acid are then added. An oil separates and crystallizes on being left to itself for some time. There is so obtained the 6-(para-aminobenzenesulfonamido)-4-(methoxymethyl)-5 - methoxy-pyrimidine of the formula

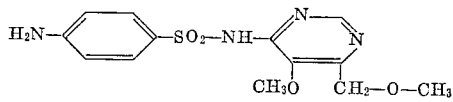

which after being recrystallized from water melts at 160–162° C.

The 4-(methoxymethyl)-5-methoxy-6-chloro-pyrimidine used as starting material can be obtained as follows:

To a solution of 4.7 g. of sodium in 200 cc. of alcohol are added 10.4 g. of formamidine acetate and 18 g. of α,γ-dimethoxy-β-oxo butyric acid ethyl ester. The mixture is stirred at 50° C. for 4 hours, then cooled to room temperature, and the solution neutralized by the addition of 2 N-hydrochloric acid and evaporated under reduced pressure. The residue is boiled with methylene chloride, undissolved matter filtered off, and the solvent distilled off. There remains 4-(methoxymethyl)-5-methoxy-6-hydroxy-pyrimidine which after being recrystallized from isopropanol melts at 147–151° C.

17 g. of the above hydroxy-pyrimidine are treated at room temperature with 100 cc. of phosphorus oxychloride and 5 g. of triethylamine. On stirring for 12 hours everything passes into solution. The solution is evaporated in vacuo care being taken to keep the temperature from rising above 50° C. The residue is dissolved in methylene chloride and the solution poured into a 3% ammonia solution. The methylene chloride layer is separated, dried and evaporated. There remains the 4-(methoxymethyl)-5-methoxy-6-chloro-pyrimidine which melts at 116° C. under a pressure of 11 mm. of Hg.

Example 15

3.4 g. of 6-(para-aminobenzenesulfonamido)-2-(methoxymethyl)-4-methoxy-5-methylpyrimidine are dissolved in 20 cc. of ethanol, and 2.1 g. of benzaldehyde added at a raised temperature. The batch is refluxed for 10 hours and the alcohol then expelled. The viscous residue gradually crystallizes completely. It is digested with ether and filtered with suction. 2.4 g. of this substance are added at 40° C. to a mixture of 8 cc. of pyridine and 1.33 g. of acetic anhydride and the whole stirred at this temperature for 2 hours. At 20° C., 2 cc. of water are added, the batch stirred at 40° C. for 1 hour, and, at 20° C., another 150 cc. of water added. The product that precipitates is N₁ - acetyl - 6 - (para - aminobenzenesulfonamido) - 2-(methoxymethyl)-4-methoxy-5-methylpyrimidine of the formula

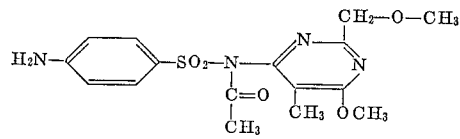

It melts at 221–224° C.

Example 16

A mixture of 19.3 g. of 2-(methoxymethyl)-4:6-dichloropyrimidine, 17.2 g. of para-aminobenzenesulfonamide and 13.8 g. of anhydrous potassium carbonate is heated for 2 hours at 150° C., during which the batch foams and carbon dioxide is liberated. On cooling, the reaction mixture solidifies; it is mixed with 150 cc. of water, the undissolved para-aminobenzenesulfonamide is isolated and the filtrate neutralized with concentrated hydrochloric acid, to yield 6-(para-aminobenzenesulfonamido)-2-(methoxymethyl)-4-chloropyrimidine of the formula

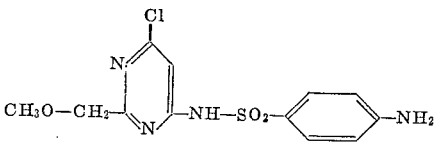

which is purified by being boiled with water and recrystallized from alcohol. The pure product melts at 150 to 151° C.

The 2-(methoxymethyl)-4:6-dichloro-pyrimidine used as starting material is prepared in the following manner:

Hydrochloric acid dried over concentrated sulfuric acid is introduced at 0° C. into a mixture of 355 g. of methoxyacetonitrile and 300 cc. of ethanol until saturation is reached. The reaction mixture is kept overnight in a refrigerator at +5° C., then rapidly suction-filtered, and the methoxyacetimino-ethyl ether hydrochloride, while still moist with ether, is introduced with cooling into 500 cc. of ammoniacal ethanol of 12% strength. The whole is agitated for 12 hours, the precipitated ammonium chloride filtered off, and the filtrate is concentrated under vacuum at 50° C. The resulting crystalline methoxyacetamidine hydrochloride melts after recrystallization from ethanol plus ether at 70° C.

148 g. of this amidine hydrochloride together with 160 g. of malonic acid diethyl ester are dissolved in 300 cc. of methanol; at 50° C. a solution of sodium methylate (prepared from 69 g. of sodium and 700 cc. of methanol) is stirred in dropwise within 1 hour, and the batch is stirred at this temperature for 12 hours, then evaporated to dryness under vacuum; the residue is dissolved in hot water and the solution is neutralized with glacial acetic acid. On cooling, 4:6-dihydroxy-2-(methoxymethyl)-pyrimidine crystallizes out; it decomposes at 210° C.

78 g. of the above compound, together with 300 cc. of phosphorus oxychloride and 101 g. of triethylamine, are heated at 140° C. on an oil bath for 1½ hours. On fractional distillation the batch yields directly pure 2-(methoxymethyl) - 4:6 - dichloropyrimidine melting at 41° C.

Example 17

17.3 g. of 2-(methoxymethyl)-4-chloro-6-amino-pyrimidine are stirred at 60° C. into a solution of 35.3 g of para-acetylaminobenzenesulfonyl chloride in 100 g. of nitrobenzene; the batch is stirred for 20 minutes longer, whereupon at the same temperature 10 g. of gaseous trimethylamine are injected. After 2 hours the trimethylamine is expelled by adding 5 N-sodium hydroxide solution and heating the whole to 100° to 105° C. and the batch is hydrolyzed. The nitrobenzene is isolated and the aqueous layer yields on neutralization with concentrated hydrochloric acid 6-(para-aminobenzenesulfonamido) - 2-(methoxymethyl)-4-chloro-pryrimidine which is identical with the product manufactured as described in Example 16.

Example 18

10 grams of 2-(methoxyethyl)-4-methyl-6-amino - pyrimidine and 15 grams of para-acetylaminobenzenesulfonyl chloride are dissolved in 100 cc. of pyridine. The mixture is maintained for 1 hour at 90° C., filtered hot and the cooled filtrate adjusted to a pH value of 2–3 with concentrated hydrochloric acid. The filtered precipitate is heated with 250° cc. of 2 N-sodium hydroxide solution for 2 hours at 90–95° C., the solution filtered hot, treated with active carbon and adjusted to a pH value of 6 with acetic acid of 50% strength while cooling with ice. The precipitating crystalline 6-(para-aminobenzenesulfonamido)-2-(methoxyethyl)-4-methyl-pyrimidine of the formula

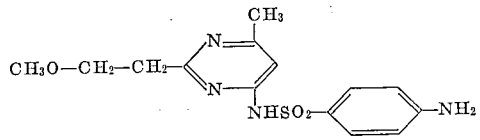

melts at 244–245° C. after recrystallization from a mixture of ethanol and water.

The 2-(methoxyethyl)-4-methyl-6-aminopyrimidine used as starting material may be prepared as follows:

Hydrochloric acid dried over concentrated sulfuric acid is introduced into a solution of 85 grams of β-methoxypropionitrile and 60 cc. of ethanol at 0° C. until saturation is achieved. The percipitated β-methoxypropioniminoethyl ether hydrochloride is filtered with suction and introduced, while still moist with ether, into 200 cc. of ammoniacal ethanol of 16% strength, the mixture is agitated for 12 hours, and the precipitated ammonium chloride filtered off. The solution is concentrated in vacuo at 50° C., the crystalline mass suspended with ether and filtered off. After recrystallization from a mixture of ethanol and ether, β-methoxypropionamidine hydrochloride melts at 85–86° C.

13.8 grams of β-methoxypropionamidine hydrochloride and 8.2 grams of diacetonitrile are pulverized together and heated with 50 cc. of glacial acetic acid for 8 hours at 120° C. The resulting precipitate is filtered off and crystallized from water to yield 2-(methoxyethyl)-4-methyl-6-aminopyrimidine melting at 254–255° C.

In an analogous manner to that described above there may be obtained from para-acetylaminobenzene-sulfonyl chloride and 2-(methoxyethyl)-6-aminopyrimidine, 2-(methoxyethyl)-4-chloro-6-amino-pyrimidine, 2-(methoxy-ethyl)-4-methoxy-6-aminopyrimidine, 4-(methoxymethyl)-6-aminopyrimidine, 2-chloro-4-(methoxymethyl)-6-aminopyrimidine, 2-methoxy-4-(methoxymethyl)-6-aminopyrimidne-2:4-di-(methoxymethyl)-6-amino-pyrimidine, 2-methyl-4-(methoxyethyl)-6-amino-pyrimidine, 2-chloro-4-(methoxyethyl)-6-amino-pyrimidine, or 2-methoxy-4-(methoxyethyl)-6-aminopyrimidine:

6-(para-aminobenzenesulfonamido)-2-(methoxyethyl)-pyrimidine,
6-(para-aminobenzenesulfonamido)-2-(methoxyethyl)-4-chloro-pyrimidine,
6-(para-aminobenzenesulfonamido)-2-(methoxyethyl)-4-methoxy-pyrimidine,
6-(para-aminobenzenesulfonamido)-4-(methoxymethyl)-pyrimidine,
6-(para-aminobenzenesulfonamido)-2-chloro-4-(methoxymethyl)-pyrimidine,
6-(para-aminobenzenesulfonamido)-2-methoxy-4-(methoxymethyl)-pyrimidine,
6-(para-aminobenzenesulfonamido)-2:4-di-(methoxymethyl)-pyrimidine,
6-(para-aminobenzenesulfonamido)-2-methyl-4-(methoxyethyl)-pyrimidine,
6-(para-aminobenzenesulfonamido)-2-chloro-4-(methoxyethyl)-pyrimidine, and
6-(para-aminobenzenesulfonamido)-2-methoxy-4-(methoxyethyl)-pyrimidine respectively.

Example 19

8 grams of 2-(methoxymethyl)-6-aminopyrimidine and 17 grams of para-carbethoxyaminobenzenesulfonyl chloride are dissolved in 100 cc. of pyridine, the mixture is allowed to stand overnight, filtered and the filtrate adjusted to a pH value of 2–3 with hydrochloric acid (1:1). The filtered precipitate is heated for 1 hour at 90° C. with 200 cc. of 2N-sodium hydroxide solution, active carbon is added to the solution, the latter is filtered hot and from the filtrate 6-(para-aminobenzenesulfonamido)-2-(methoxymethyl)-pyrimidine of the formula

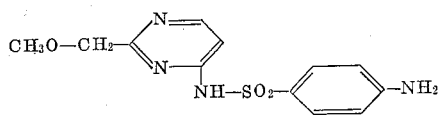

is precipitated with acetic acid of 50% strength at a pH value of 5–6; M.P. 237–238° C. after recrystallization from a mixture of ethanol and water.

The 2-(methoxy-methyl)-6-aminopyrimidine used as starting material may be obtained as follows:

38.6 grams of 2-(methoxymethyl)-4:6-dichloropyrimidine are reacted with 250 cc. of ammoniacal ethanol of 12% strength for 10 hours at 80° C. in an autoclave. After cooling, the mixture is evaporated to dryness. Recrystallization of the residue from water yields 2-(methoxymethyl)-4-chloro-6-amino-pyrimidine in the form of white needles melting at 102° C.

17.3 grams of 2-(methoxymethyl)-4-chloro-6-aminopyrimidine are hydrogenated in 250 cc. of absolute ethanol with the addition of 3 grams of palladium active carbon catalyst of 5% strength and 4.4 grams of magnesium oxide as hydrochloric acid acceptor. The catalyst is filtered off and the solution evaporated to dryness. The residue is taken up in water, neutralized with acetic acid and the solution extracted with chloroform. After distilling off the solvent, the residue is recrystallized from a mixture of ethyl acetate and petroleum ether to yield 2-(methoxymethyl)-6-amino-pyrimidine melting at 111–112° C.

Example 20

14.5 grams of para-carbethoxy-aminobenzenesulfochloride are added in portions to a solution of 10.7 grams of 2-(methoxymethyl)-4-(β-methoxyethoxy)-6-aminopyrimidine in 100 cc. of absolute pyridine, the reaction solution is stirred for 72 hours at room temperature, then poured on to a mixture of ice and hydrochloric acid while maintaining a pH value of 2,6-(para-carbethoxy-aminobenzenesulfonamido)-2-(methoxymethyl)-4-(β-methoxyethoxy)-pyrimidine precipitating; the products melts at 105–106° C. Hydrolysis is performed by boiling the product with 250 cc. of N-sodium hydroxide solution for one hour. On acidification with glacial acetic acid, 6-(para-aminobenzenesulfonamido)-2-(methoxymethyl)-4-(β-methoxyethoxy)-pyrimidine of the formula

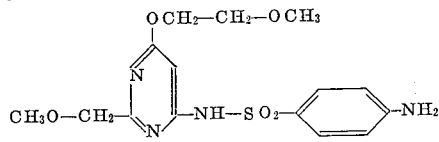

melting at 87° C. precipitates.

The 2-(methoxymethyl)-4-(β-methoxyethoxy)-6-aminopyrimidine used as starting product is prepared by reacting 17.3 grams of 2-(methoxymethyl)-4-chloro-6-aminopyrimidine with a solution of 5 grams of sodium in 50 cc. of glycol monomethyl ether while heating for 24 hours at 100° C. The excess ether is decanted, the residue suspended in water, neutralized with acetic acid, filtered and the well dried 2-(methoxymethyl)-4-(β-methoxyethoxy)-6-aminopyrimidine recrystallized from ethyl acetate; M.P. 104° C.

Example 21

17.2 grams of 2-(methoxymethyl)-4-methyl-6-chloropyrimidine are dissolved in 160 cc. of benzolic trimethylamine solution of 85% strength and allowed to stand for 5 days. The benzene is then distilled in vacuo, and 100 cc. of absolute ether added. The 6-trimethylammonium compound is filtered with suction and added to a melt of 47 grams of $N_4$-acetyl-sulphanilamide sodium and 48 grams of acetamide at 95–100° C. in the course of 10 minutes, heated for 1½ hours at 105° C. and the acetamide distilled in vacuo. The residue is dissolved in 100 cc. of water, neutralized with glacial acetic acid and rendered alkaline with sodium carbonate, allowed to stand overnight in a refrigerator, the excess N₄-acetylsulphanilamide filtered off, the filtrate adjusted to pH 4–5, 6-(para-acetyl-amino-benzenesulfonamido) - 2 - (methoxymethyl)-4-methyl-pyrimidine precipitating after some hours. (After recrystallization from water: M.P. 194–195° C.) The acetyl compound is hydrolyzed with 100 cc. of 2 N-sodium hydroxide solution in the course of 2 hours to form 6-(para-amino-benzenesulfonamido) - 2 - methoxymethyl) - 4-methyl-pyrimidine of the formula

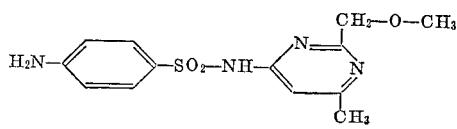

which precipitates after neutralization with acetic acid.

The 2 - (methoxymethyl)-4-methyl-6-chloropyrimidine used as starting material is prepared as follows:

62 grams of the methoxyacetamidine hydrochloride described in Example 16 with 65 grams of acetoacetic acid ester are condensed with 34.5 grams of sodium in 200 cc. of methanol, by heating the mixture for 8 hours at 50° C. The methanol is distilled off, the residue dissolved in water, neutralized with acetic acid and the solution then evaporated to dryness. The well dried residue is extracted with ether. The resulting 2-(methoxymethyl)-4-methyl-6-hydroxypyrimidine is recrystallized from ether; M.P. 103° C.

38.5 grams of the above compound are heated with 150 cc. of phosphorus oxychloride and 25 grams of triethylamine at 140° C. for two hours in an oil bath. The phosphorus oxychloride is distilled in vacuo, the residue poured into ammoniacal ice-water and then extracted with methylene chloride. By distillation, 2-(methoxymethyl)-4-methyl-6-chloropyrimidine boiling at 73° C. under 0.6 mm. of pressure is obtained.

Example 22

10.0 grams of 2-methyl-4-(methoxymethyl)-6-chloropyrimidine are added dropwise at 130° C. with stirring to a mixture of 20.0 grams of sulphanilamide, 20.0 grams of acetamide and 16 grams of anhydrous potassium carbonate. The reaction mixture is heated for 4 hours at 140° C. and then cooled; 100 cc. of water are added. The precipitate is filtered off, and 2 N-hydrochloric acid is added to the filtrate until the pH value is 6–7. After being allowed to stand for some time, a precipitate settles out which is filtered and stirred with 100 cc. of water at a temperature of 70–80° C. The insoluble portion is recrystallized from alcohol to yield 6-(para-aminobenzenesulfonamido)-2-methyl-4-(methoxymethyl)-pyrimidine of the formula

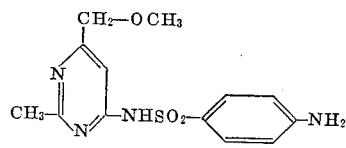

in the form of crystals melting at 187–190° C.

The 2 - methyl-4-(methoxymethyl)-6-chloro-pyrimidine used as starting material may be prepared as follows:

5.0 grams of acetamidine hydrochloride are added to a solution of 2.2 grams of sodium in 50 cc. of absolute alcohol, and the whole is stirred for 15 minutes at room temperature. 8.0 grams of γ-methoxy-acetoacetic acid ester are then added and the whole heated for 4 hours at the boil. The solution is then evaporated in vacuo to leave a solid residue which is boiled with 100 cc. of methylene chloride. Evaporation of the solvent yields crystalline 2-methyl-4-(methoxymethyl)-6-hydroxy-pyrimidine which melts at 173–174° C. after sublimation.

10.0 grams of the hydroxy-pyrimidine are added to 100 cc. of phosphorus oxychloride. After the addition of 5.0 grams of dimethylaniline the reaction mixture is stirred for 4 hours at room temperature and then evaporated in vacuo. The residue is dissolved in 100 cc. of methylene chloride and the solution poured into cold ammonium hydroxide solution of 3% strength. After shaking the reaction solution well, the organic phase is evaporated, dried over sodium sulfate and the solvent distilled off. Distillation of the residue yields 2-methyl-4-(methoxymethyl)-6-chloro-pyrimidine which boils at 90–100° C. under 11 mm. of pressure.

Example 23

5.4 grams of 6-(para-aminobenzenesulfonamido)-2-(methoxymethyl)-4-methoxy-pyrimidine are suspended in 10 cc. of acetone and 1.3 grams of pyridine. 22 grams of acetic anhydride are added dropwise in the course of 10 minutes, the reaction mixture is stirred for 5 hours and then allowed to stand for 2 days, a white product precipitating. 20 cc. of ammonia of 2–3% strength are added while cooling with ice, the reaction mixture is filtered rapidly with suction to yield N₁-acetyl-6-(para-aminobenzenesulfonamido) - 2 - (methoxymethyl)-4-methoxy-pyrimidine of the formula

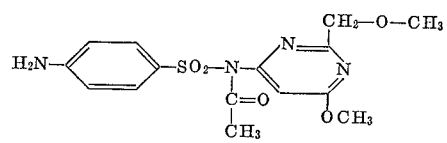

which after recrystallization from ethanol melts at 178–179° C.

Example 24

18.3 grams of 2-(methoxymethyl)-4-ethoxy-6-aminopyrimidine are dissolved in 200 cc. of pyridine; 29 grams of para-carbethoxyaminobenzenesulfochloride are then added in portions, the mixture stirred for 48 hours at room temperature, poured on to ice-water and the pH adjusted to about 2 by the addition of concentrated hydrochloric acid. The precipitate is filtered with suction, boiled for 1 hour with 500 cc. of N-sodium hydroxide solution, the hot solution treated with active carbon, filtered and adjusted to a pH value of 5.5–6 with acetic acid while cooling with ice. 6-(para-aminobenzenesulfonamido)-2-(methoxymethyl)-4-ethoxy-pyrimidine of the formula

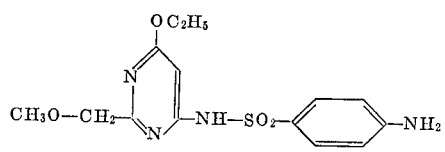

precipitates in crystalline form; M.P. 144–145° C.

The 2 - (methoxymethyl)-4-ethoxy-6-aminopyrimidine used as starting material is prepared as follows:

17.3 grams of 2-(methoxymethyl)-4-chloro-6-aminopyrimidine are added to a solution ethylate solution of 4.6 grams of sodium in 100 cc. of ethanol, and the mixture is stirred for 20 hours at 60° C. In order to completely separate the sodium salt, carbon dioxide is introduced and 50 cc. of absolute ether added, the salt filtered off and the filtrate evaporated to dryness. 2-(methoxymethyl)-4-ethoxy-6-aminopyrimidine of the formula

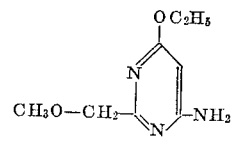

melts at 99° C. after recrystallization from carbon tetrachloride.

Example 25

29 grams of para-carbethoxyaminobenzenesulfochloride are added in portions to a solution of 19.7 grams of 2-(methoxymethyl)-4-isopropoxy-6-aminopyrimidine in 250 cc. of absolute pyridine and the whole stirred for 12 hours at room temperature. The solution is then poured on to a mixture of ice and hydrochloric acid so that the pH value remains about 2. The pricipitate is filtered with suction and hydrolyzed with 500 cc. of N-sodium hydroxide solution for 1 hour at 90° C. By the addition of acetic acid 6-(para-aminobenzenesulfonamido) - 2 - (methoxymethyl)-4-isopropoxypyrimidine of the formula

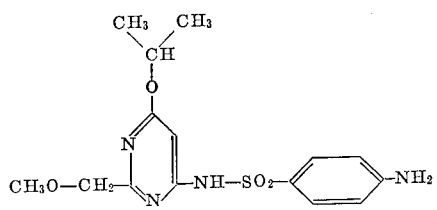

is obtained which melts at 166° C. after recrystallization from methanol.

The 2-(methoxymethyl)-4-isopropoxy-6-aminopyrimidine used as starting material is obtained by mixing 17.3 grams of 2-(methoxymethyl)-4-chloro-6-aminopyrimidine with a sodium isopropylate solution consisting of 4.6 grams of sodium and 200 cc. of isopropanol for 24 hours at 60° C. The compound of the formula

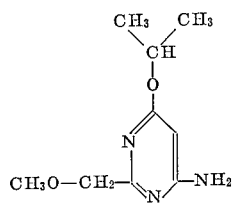

melts at 84° C. after crystallization from benzene.

Example 26

29 grams of para-carbethoxyaminobenzenesulfochloride are added in portions to a solution of 18.3 grams of 2-(ethoxymethyl)-4-methoxy-6-aminopyrimidine in 250 cc. of absolute pyridine, the whole is stirred for 24 hours at room temperature, the solution then poured on to a mixture of ice and hydrochloric acid so that the pH value remains about 2 and the temperature below 10° C. The precipitate filtered with suction is heated for 1 hour with 500 cc. of N-sodium hydroxide solution at 90° C., at the end with the addition of active carbon. After filtration the filtrate is acidified with glacial acetic acid while cooling with ice, 6-(para-aminobenzenesulfonamido)-2-(ethoxymethyl)-4-methoxypyrimidine of the formula

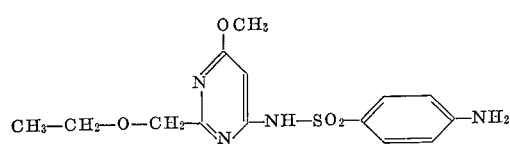

precipitating; M.P. 154° C.

The 2 - (ethoxymethyl)-4-methoxy-6-aminopyrimidine used as starting material may be prepared as follows:

Hydrochloric acid dried over concentrated sulfuric acid is introduced into a solution of 122.5 grams of ethoxyacetonitrile and 69 grams of ethanol at 0° C. until saturation is reached. The ethoxyacetiminoethyl ether hydrochloride is suction-filtered, introduced into 600 cc. of ammoniacal ethanol of 12% strength, the mixture agitated for 12 hours, the precipitated ammonium chloride filtered and the filtrate concentrated at 50° C. The crystalline mass is then suspended in ether and suction-filtered.

95 grams of the ethoxyacetamidine hydrochloride are introduced into a sodium methylate solution (prepared from 47.5 grams of sodium and 800 cc. of methanol). 110 grams of malonic acid diethyl ester are added dropwise at room temperature and the whole is heated for 16 hours at 60° C. The reaction mixture is evaporated to dryness and taken up in water. On being neutralized with glacial acetic acid, 2-(ethoxymethyl)-4:6-dihydroxypyrimidine precipitates; M.P. 219° C. with decomposition.

68 grams of the above compound are chlorinated with 300 cc. of phosphorus oxychloride and 110 cc. of triethylamine. On fractional distillation 2-(ethoxymethyl)-4:6-dichloropyrimidine boiling at 49° C. under 0.03 mm. of pressure is obtained.

54.9 grams of the above compound are heated with about 200 cc. of liquid ammonia in an autoclave for 10 hours at 70° C. After blowing off the ammonia, the residue is recrystallized from water to yield 2-(ethoxymethyl)-4-chloro-6-amino-pyrimidine melting at 117–118° C.

44.8 grams of the above pyrimidine are heated with a sodium methylate solution (prepared from 11 grams of sodium in 300 cc. of methanol) for 24 hours at 50° C. The reaction mixture is then neutralized with acetic acid, evaporated to dryness, suspended in water and the residue recrystallized from carbon tetrachloride to yield 2-(ethoxymethyl)-4-methoxy-6-amino-pyrimidine melting at 108° C.

Example 27

24 grams of para-nitrobenzenesulfochloride are added in portions at 50° C. to a solution of 13.9 grams of 2-(methoxymethyl)-6-aminopyrimidine in 100 cc. of pyridine. The batch is stirred for 48 hours, the precipitate filtered off, the filtrate poured on to ice and the pH adjusted to 2–3 with concentrated hydrochloric acid. The precipitate is hydrogenated with Raney nickel in an alkaline mixture of ethanol and water. The catalyst is filtered off and the filtrate concentrated, 6-(para-aminobenzenesulfonamido)-2-(methoxymethyl)-pyrimidine precipitating. After recrystallization from a mixture of ethanol and water, the product melts at 237–238° C.

Example 28

13 grams of para-acetylaminobenzenesulfonyl chloride are added in the course of 30 minutes to a solution of 8.5 grams of 2-(methoxymethyl)-4-methoxy-6-aminopyrimidine in 75 cc. of pyridine with stirring. After the reaction has subsided, the batch is heated for 1 hour at 90° C. 750 cc. of water are then added and the pH adjusted to about 2 by the addition of concentrated hydrochloric acid while cooling with ice. The precipitate is boiled for 2 hours with 500 cc. of 2N-sodium hydroxide solution, the alkaline solution filtered off and the filtrate neutralized while still hot with concentrated hydrochloric acid, to yield 6 - (para-aminobenzenesulfonamido)-2-(methoxymethyl)-4-methoxypyrimidine of the formula

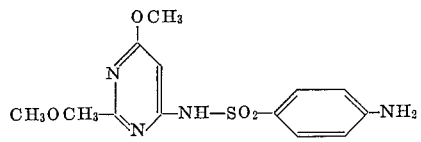

in crystalline form. After recrystallization from alcohol the product melts at 139–140° C.

The 2-(methoxymethyl)-4-methoxy-6-amino-pyrimidine used as starting material may be prepared as follows:

17.3 grams of 2-(methoxymethyl)-4-chloro-6-aminopyrimidine are dissolved in an autoclave in 150 cc. of methanol and 10.8 grams of sodium methylate are added. The reaction mixture is shaken and heated for 10 hours at 120° C., then allowed to cool and evaporated to dryness. 2-methoxymethyl-6-amino-4-methoxy-pyrimidine of the formula

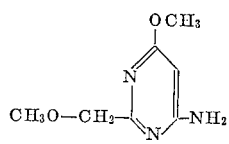

melts at 93–94° C.

Example 29

12 grams of para-nitrobenzenesulfochloride are added in portions to 8.5 grams of 2-(methoxymethyl)-4-methoxy-6-amino-pyrimidine dissolved in 75 cc. of pyridine. After the exothermic reaction has subsided, the solution is stirred for 24 hours, poured on to ice and acidified with concentrated hydrochloric acid to a pH value of 2–3. The precipitate is dissolved in 250 cc. of ethanol of 70% strength with the addition of sodium hydroxide solution and hydrogenated with Raney nickel as catalyst. The catalyst is filtered off, the solution evaporated to dryness, digested with a little water and then filtered again. After recrystallization from ethanol 6-(para-aminobenzenesulfoamido)-2-(methoxymethyl) - 4 - methoxypyrimidine melting at 139–140° C. is obtained.

Example 30

34.4 grams of sulfanilamide, 27.6 grams of potassium carbonate and 12 grams of acetamide are heated together at about 120° C. with stirring. 18.8 grams of 2-(methoxymethyl)-4-methoxy-6-chloropyrimidine are added dropwise in the course of 10 minutes and the batch is stirred for 2 hours at 140° C. The cooled mass is treated with 75 cc. of water and clarified at 90° C. with active carbon. The pH value of the filtrate is adjusted to 8–8.2 and the mixture cooled to 15° C. The unreacted sulphanilamide is filtered and the filtrate stirred into acetic acid ice-water in such a way that the pH value always remains at about 5. 6-(para-aminobenzenesulfonamido)-2-(methoxymethyl)-4-methoxy-pyrimidine, which is identical with the product obtained according to Example 28, precipitates.

Example 31

10.1 grams of 2:4-di-(methoxymethyl)-6-chloro-pyrimidine are added in portions at 115° C. to a melt of 17.2 grams of sulfanilamide, 14 grams of anhydrous potassium carbonate and 7.5 grams of acetamide. When the evolution of gas has subsided, stirring is continued for one hour, the reaction mixture is taken up in 100 cc. of water and the solution treated with active carbon at 90° C. The pH value of the filtered solution is adjusted to about 8 to 8.2, the excess sulfanilamide precipitating on cooling. The precipitate is filtered off. The solution is neutralized, and 6-(para-aminobenzenesulfonamido)-2:4-di-(methoxymethyl)-pyrimidine of the formula $$H_2N-\langle \rangle -SO_2-NH-\underset{CH_2OCH_3}{\overset{CH_2OCH}{\underset{N}{\bigg\langle}}}$$

precipitates. After recrystallization from a mixture of ethanol and water the product melts at 125–126° C.

The 2:4-di-(methoxymethyl)-6-chloro-pyrimidine used as starting material is prepared as follows:

13 grams of methoxyacetamidine in 100 cc. of absolute ethanol and 20 grams of γ-methoxy-acetoacetic acid ethyl ester are added to a solution of 5.9 grams of potassium in 100 cc. of absolute ethanol and heated for 4 hours under reflux. The solvent is distilled off, the residue taken up in water, neutralized and the solution extracted with methylene chloride. The solution is dried and the methylene chloride distilled off to yield 2:4-di-(methoxymethyl)-6-hydroxy-pyrimidine which is recrystallized from ethyl acetate; M.P. 98–99° C.

15 grams of the above product are chlorinated with phosphorus oxychloride with the addition of triethylamine, the phosphorus oxychloride is distilled off, the residue poured on to ice, neutralized with ammonia and extracted with methylene chloride. The dried solution is fractionated. 2:4-di-(methoxymethyl)-6-chloro-pyrimidine boils at 77–78.5° C. under 0.15 mm. of pressure.

Example 32

9.0 grams of 4 - (methoxymethyl)-6-chloro-pyrimidine are added dropwise and with stirring at 130° C. to a mixture of 18.0 grams of sulphanilamide, 18.0 grams of acetamide and 15 grams of anyhydrous potassium carbonate. After 4 hours the reaction mixture is cooled and treated with 100 cc. of water. The precipitate which settles out is filtered off and the filtrate treated with 2 N-hydrochloric acid until a pH value of 6–7 is achieved. After some time a precipitate settles out which is recrystallized from alcohol to yield 6 ₋ (para - aminobenzenesulfonamido) - 4-(methoxymethyl)-pyrimidine of the formula

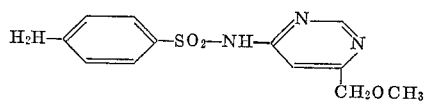

in the form of crystals melting at 207–209° C.

The 4-(methoxymethyl)-6-chloro-pyrimidine used as starting material may be prepared as follows:

10.4 grams of formamidine acetate and 16.4 grams of γ-methoxy-acetoacetic acid ethyl ester are added to a solution of 4.7 grams of sodium in 200 cc. of alcohol. The reaction mixture is stirred for 10 hours at 50° C., the precipitate is filtered off and the filtrate evaporated to dryness. The residue is dissolved in water and the solution neutralized by the addition of 2 N-hydrochloric acid. The reaction solution is evaporated to dryness, and the residue boiled with methylene chloride. The extract is dried and evaporated. A little acetone is added to the residue, whereupon 4-hydroxy-6-(methoxymethyl) - pyrimidine precipitates in the form of crystals melting at 155° C.

8 grams of the above product are stirred with 50 cc. of phosphorus oxychloride for 10 hours at room temperature after the addition of 3 grams of triethylamine. The reaction mixture is then evaporated in vacuo, the residue dissolved in methylene chloride and the solution poured on to ammonia of 3% strength. The methylene chloride solution is evaporated. On distillation, 4 - chloro - 6-(methoxymethyl)-pyrimidine is obtained which boils at 90–93° C. under 12 mm. of pressure.

Example 33

Tablets containing 500 mg. of 6-(para-aminobenzenesulfonamido)-2-(methoxymethyl) - 4 - methoxy - pyrimidine may be prepared with the following ingredients:

| | Per tablet, mg. |
|---|---|
| 6-(para-aminobenzenesulfonamido) - 2 - (methoxymethyl)-4-methoxypyrimidine | 500.0 |
| Wheat starch | 35.0 |
| Colloidal silicic acid with hydrolyzed starch | 30.0 |
| Gelatine | 6.0 |
| Arrowroot | 30.0 |
| Magnesium stearate | 6.0 |
| Talc | 18.0 |
| | 625.0 |

Method

6 - (para - aminobenzenesulfonamido) - 2 - (methoxymethyl)-4-methoxypyrimidine is mixed with wheat starch and colloidal silicic acid with hydrolyzed starch. The gelatine is dissolved in ten times the quantity of water and the power-mixture kneaded with this solution. The mixture is dried, comminuted and, after the addition of arrowroot, talc and magnesium stearate, tabletted in the conventional manner.

Example 34

At 120° C., 22.3 g. of 2-(methoxymethyl)-4-methoxy-5,6-dichloropyrimidine are added in the course of 10 minutes to a melt of 34.4 g. of sulfanilamide, 28 g. of anhydrous potassium carbonate and 15 g. of acetamide. The batch is stirred on for 2 hours at 150° C. and, after it has cooled, 120 cc. of water are added, and the pH adjusted to 8.2. The sulfanilamide which precipitates is filtered off and the filtrate adjusted to pH 6–6.5 with glacial acetic acid. The 6-(para-aminobenzene-sulfonamido)-2-(methoxymethyl) - 4-methoxy-5-chloropyrimidine of the formula

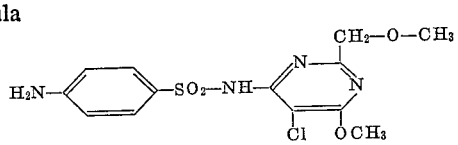

crystallizes out and, after being recrystallized from ethanol, melts at 171–172° C.

The 2-(methoxymethyl)-4-methoxy-5,6-dichloropyrimidine used as starting material can be obtained as follows:

22.7 g. of 2-(methoxymethyl)-4,5,6-trichloropyrimidine, dissolved in 150 cc. of absolute methanol, are added dropwise while cooling with ice, to a methylate solution prepared from 2.3 g. of sodium and 50 cc. of absolute methanol. Stirring is continued for 3 hours with continued cooling, during which the mixture should become neutral. The salt is filtered off, the methanol distilled off, and the residue subjected to fractional distillation. The 2-(methoxymethyl)-4-methoxy-5,6-dichloropyrimidine boils at 108° C. under a pressure of 0.1 mm. Hg. and melts at 59–60° C.

Example 35

14.5 g. of 2-(methoxymethyl)-4:6-dichloro-5-methoxypyrimidine are added at 130° C. to a melt of 22.4 g. of sulfanilamide, 18.2 g. of anhydrous potassium carbonate and 9.8 g. of acetamide. The mixture is stirred for 2 hours at 150° C., cooled and then treated with 100 cc. of water and the pH value adjusted to 8.2–8.5. The excess sulfanilamide is filtered off and the filtrate neutralized with glacial acetic acid, 6-(para-aminobenzenesulfonamido) - 2 - (methoxymethyl) - 4 - chloro - 5 - methoxy-pyrimidne of the formula

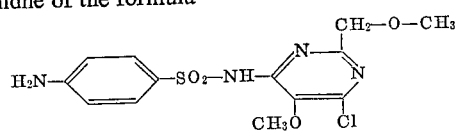

precipitating. After recrystallization from ethanol the product melts at 167–168° C.

The 2-(methoxymethyl)-4:6-dichloro-5-methoxypyrimidine used as starting material may be prepared as follows:

62 g. of methoxyacetamidine hydrochloride and 95 g. of methoxymalonic acid ethyl ester are dissolved in 200 cc. of absolute methanol. A methylate solution consisting of 34.5 g. of sodium and 800 cc. of absolute methanol is added dropwise at 10–20° C., and the batch is stirred for 24 hours at room temperature. The methanol is then evaporated under a vacuum, the residue taken up in a little water, the pH of the solution adjusted to 6 with glacial acetic acid and then extracted with ether. The ether is distilled to yield 2-(methoxymethy)-4:6-dihydroxy-5-methoxypyrimidine which melts at 213–214° C. after recrystallization from glacial acetic acid.

27.9 g. of this compound together with 100 cc. of toluene, 50 cc. of phosphorus oxychloride and 31.5 cc. of triethylamine are heated for 2 hours at 120° C. The excess phosphorus oxychloride is then distilled off, the residue poured on to ice and neutralized with ammonia. The precipitate is taken up in methylene chloride, the solution dried and then fractionated. 2-(methoxymethyl)-4:6-dichloro-5-methoxypyrimidine boils at 92–93° C. under 0.22 mm. of pressure and melts at 40° C.

Example 36

17.9 g. of 6-(para-aminobenzenesulfonamido)-2-methoxymethyl-4-chloro-5-methoxypyrimidine are reacted with 13.5 g. of sodium methylate in 250 cc. of methanol for 12 hours at 120° C. in a bomb tube. The solution is concentrated, the residue dissolved in water and the solution neutralized with acetic acid to yield 6-(para-aminobenzenesulfonamido) - 2 - (methoxymethyl - 4:5 - dimethoxypyrimidine of the formula

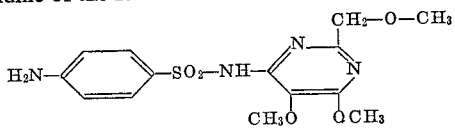

What is claimed is:
1. A member selected from the group consisting of 6-(para-aminobenzenesulfonamido)-pyrimidine of the formula

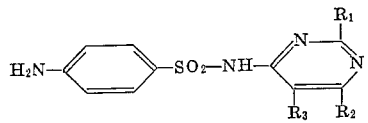

in which one of the radicals $R_1$ and $R_2$ stands for lower alkoxy-lower alkyl and the other for a member selected from the group consisting of hydrogen, halogen, lower alkyl, lower alkoxy, lower alkoxy-lower alkyl and lower alkoxy-lower alkoxy and $R_3$ stands for a member selected from the group consisting of hydrogen, halogen, lower alkyl and lower alkoxy, and a metal salt thereof selected from the group consisting of an alkali metal, an alkaline earth metal and an earth metal salt.

2. A member selected from the group consisting of 6-(para-aminobenzenesulfonamido)-pyrimidine of the formula

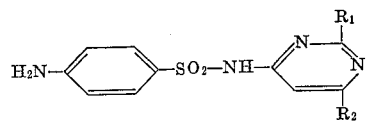

in which one of the radicals $R_1$ and $R_2$ stands for lower alkoxy-lower alkyl and the other for a member selected from the group consisting of hydrogen, halogen, lower alkyl, lower alkoxy, lower alkoxy-lower alkyl and lower alkoxy-lower alkoxy, and a metal salt thereof selected from the group consisting of an alkali metal, an alkaline earth metal and an earth metal salt.

3. A compound of the formula

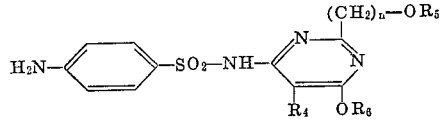

in which $R_5$ and $R_6$ each represents lower alkyl and $n$ stands for an integer from 1 to 3 and $R_4$ for a member selected from the group consisting of hydrogen, lower alkyl and lower alkoxy.

4. A compound of the formula

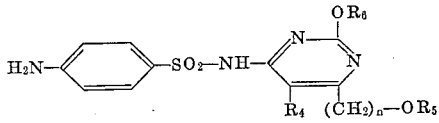

in which $R_5$ and $R_6$ each represents lower alkyl and $n$ stands for an integer from 1 to 3 and $R_4$ for a member selected from the group consisting of hydrogen, lower alkyl and lower alkoxy.

5. An $N_1$-lower alkane carboxylic acid acyl-derivative of a compound claimed in claim 1.

6. A member selected from the group consisting of 6 - (para - aminobenzenesulfonamido) - 2 - (methoxymethyl)-4-methoxypyrimidine, and a metal salt thereof selected from the group consisting of an alkali metal, an alkaline earth metal and an earth metal salt.

7. A member selected from the group consisting of
6-(para-aminobenzenesulfonamido)-2-(methoxyethyl)-4-methylpyrimidine,
6-(para-aminobenzenesulfonamido)-2-(methoxymethyl)-pyrimidine,
6-(para-aminobenzenesulfonamido)-2-(methoxymethyl)-4-($\beta$-methoxyethoxy)-pyrimidine,
6-(para-aminobenzenesulfonamido)-2-(methoxymethyl)-4-methylpyrimidine,
6-(para-aminobenzenesulfonamido)-2-methyl-4-(methoxymethyl)-pyrimidine,
6-(para-aminobenzenesulfonamido)-2,4-di-(methoxymethyl)-pyrimidine,
6-(para-aminobenzenesulfonamido)-2-(methoxymethyl)-4-ethoxypyrimidine,
6-(para-aminobenzenesulfonamido)-2-(methoxymethyl)-4-(isoproxy)-pyrimidine, and
6-(para-aminobenzenesulfonamido)-2-(ethoxymethyl)-4-methoxypyrimidine.

8. A member selected from the group consisting of
6-(para-aminobenzenesulfonamido)-2,4-di-(methoxymethyl)-5-methoxypyrimidine,
6-(para-aminobenzenesulfonamido)-2,4-di-(methoxymethyl)5-methylpyrimidine,
6-(para-aminobenzenesulfonamido)-2-(methoxymethyl)-4-methoxy-5-ethylpyrimidine,
6-(para-aminobenbenesulfonamido)-2-(methoxymethyl)-4-methoxy-5-methylpyrimidine,
6-(para-aminobenzenesulfonamido)-2,5-dimethyl-4-(methoxymethyl)-pyrimidine,
6-(para-aminohenbenesulfonamido)-4-(methoxymethyl)-5-methylpyrimidine,
6-(para-aminobenzenesulfonamido)-2,4-di-(methoxymethyl)-5-ethylpyrimidine,
6-(para-aminobenzenesulfonamido)-2-(methoxymethyl)-5-methoxypyrimidine,
6-(para-aminobenzenesulfonamido)-2-(methoxymethyl)-5-chloropyrimidine,
6-(para-aminobenzenesulfonamido)-2-(methoxymethyl)-4,5-dichloro-pyrimidine,
6-(para-aminobenzenesulfonamido)-2-methyl-4-(methoxymethyl)-5-methoxy-pyrimidine and
6-(para-aminobenzenesulfonamido)-4-(methoxymethyl)-5-methoxy-pyrimidine.

9. $N_1$ - acetyl - 6 - (para - aminobenzenesulfonamido)-2-(methoxymethyl)-4-methoxy-pyrimidine.

10. $N_1$ - acetyl - 6 - (para-aminobenzenesulfonamido)-2-(methoxymethyl)-4-methoxy-5-methylpyrimidine.

11. A compound of the formula

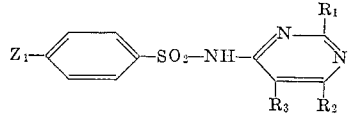

in which one of the radicals $R_1$ and $R_2$ stands for lower alkoxy-lower alkyl and the other for a member selected from the group consisting of hydrogen, halogen, lower alkyl, lower alkoxy, lower alkoxy-lower alkyl and lower alkoxy-lower alkoxy, $R_3$ stands for a member selected from the group consisting of hydrogen, halogen, lower alkyl and lower alkoxy and $Z_1$ represents a member selected from the group consisting of nitro, phenylazo, lower carbalkoxyamino and lower alkanoylamino.

12. A bis-(para-Z-benzenesulfonyl)-6-amino-2-$R_1$-4-$R_2$-5-$R_3$-pyrimidine, in which one of the radicals $R_1$ and $R_2$ stands for lower alkoxy-lower alkyl and the other for a member selected from the group consisting of hydrogen, halogen, lower alkyl, lower alkoxy, lower alkoxy-lower alkyl and lower alkoxy-lower alkoxy, $R_3$ stands for a member selected from the group consisting of hydrogen, halogen, lower alkyl and lower alkoxy and Z for a member selected from the group consisting of amino, nitro, azo and acylamino.

13. 6 - (para - acetylaminobenzenesulfonamido) - 2-(methoxymethyl)-4-methoxypyrimidine.

14. A member selected from the group consisting of
6-(para-aminobenzene-sulfonamido)-2-(methoxymethyl)-4-methoxy-5-chloropyrimidine,
6-(para-aminobenzenesulfonamido)-2-(methoxymethyl)-4-chloro-5-methoxypyrimidine,
6-(para-aminobenzenesulfonamido)-2-(methoxymethyl)-4:5-dimethoxypyrimidine, alkali, alkaline earth and earth metal salts thereof and $N_1$-carboxylic acid acyl derivatives thereof.

References Cited

UNITED STATES PATENTS

| | | | |
|---|---|---|---|
| 2,350,265 | 5/1944 | Williams et al. | 210—256.4 |
| 2,407,966 | 9/1946 | Sprague | 260—239.75 |
| 2,703,800 | 3/1955 | Bretschneider et al. | 260—239.75 |
| 2,891,949 | 6/1959 | Webb et al. | 260—239.75 |
| 3,082,206 | 3/1963 | Langley et al. | 260—239.75 |
| 3,091,610 | 5/1963 | Bretschneider et al. | 260—239.75 |

FOREIGN PATENTS

| | | |
|---|---|---|
| 1,329,276 | 4/1963 | France. |
| 1,329,867 | 5/1963 | France. |

OTHER REFERENCES

Ulbricht et al., J. Org. Chem., vol 21, pp. 567 to 570 (1956).

Okuda et al.: J. Org. Chem., vol. 23, pp. 1738 to 1741 (1958).

Okuda et al.: J. Org. Chem., vol. 24, pp. 14 to 16 (1959).

Braker et al.: J. Am. Chem. Soc. vol. 69, pp. 3072–3078 (1947) QD 1 A5.

Bretschneider et al.: Monatash, Chem., vol. 92, pp. 75–78 (1961) QD 1 M73.

Hortsmann et al.: Arnz. Forsch, vol. 11, p. 682 (1961).

Van Dyke et al.: J. of Pharmacology, vol. 83, p. 207 (1945).

Photstat of original available in Lit. Shoe of 260–239.75.

JOHN D. RANDOLPH, *Primary Examiner.*

U.S. Cl. X.R.

99—2; 260—256.4, 256.5, 543, 154, 251; 424—229

UNITED STATES PATENT OFFICE
CERTIFICATE OF CORRECTION

Patent No. 3,422,098

January 14, 1969

Paul Schmidt et al.

It is certified that error appears in the above identified patent and that said Letters Patent are hereby corrected as shown below:

Column 27, line 35, "benbenesulfonamido" should read -- benzenesulfonamido --; line 39, "henbenesulfonamido" should read -- benzenesulfonamido --. Column 28, lines 15 and 16, "azo and acylamino" should read -- phenylazo, lower carbalkoxyamino and lower alkanoylamino --.

Signed and sealed this 31st day of March 1970.

(SEAL)
Attest:

Edward M. Fletcher, Jr.

Attesting Officer

WILLIAM E. SCHUYLER, JR.

Commissioner of Patents